United States Patent [19]

Bie, Jr.

[11] 4,313,403
[45] Feb. 2, 1982

[54] INTERNAL COMBUSTION ENGINE

[76] Inventor: Norman Bie, Jr., 304 W. Bay Dr., Largo, Fla. 33540

[21] Appl. No.: 73,390

[22] Filed: Sep. 7, 1979

[51] Int. Cl.³ .............................................. F02B 25/12
[52] U.S. Cl. .............................. 123/53 B; 123/48 D; 123/53 A
[58] Field of Search .............. 123/48 D, 48 A, 48 AA, 123/78 A, 78 AA, 53 R, 53 B, 53 A

[56] References Cited

U.S. PATENT DOCUMENTS

| | | | |
|---|---|---|---|
| 1,349,846 | 8/1920 | Meyer | 123/53 B |
| 1,542,056 | 6/1925 | Guy et al. | 123/48 |
| 1,555,454 | 9/1925 | Bugatti | 123/53 B |
| 1,714,364 | 5/1929 | Hall | 123/48 |
| 1,812,983 | 7/1931 | Redmond | 123/48 |
| 2,049,253 | 7/1936 | Ely | 123/78 A |
| 2,170,818 | 8/1939 | Hanson | 123/53 B |
| 2,295,120 | 9/1942 | Maw | 123/53 B |
| 2,316,790 | 4/1943 | Hickey | 123/48 |
| 2,369,738 | 2/1945 | Johnson | 123/48 |
| 2,388,452 | 11/1945 | Weatherup | 123/48 |
| 2,400,747 | 5/1946 | Fisher | 123/48 |
| 2,666,421 | 1/1954 | Ring | 123/78 AA |
| 4,143,628 | 3/1979 | Gustavsson | 123/78 A |
| 4,168,678 | 9/1979 | Nohira | 123/78 A |
| 4,182,288 | 1/1980 | Thauer | |
| 4,191,139 | 3/1980 | Tompkins | 123/78 A |

FOREIGN PATENT DOCUMENTS 727414   6/1932   France .............. 123/53 B

Primary Examiner—Ronald B. Cox

[57] ABSTRACT

An internal combustion engine is provided having a pair of cylinders interconnected by means of a narrow connecting channel. A working piston reciprocates in one cylinder and is conventionally attached to a crankshaft by means of a connecting rod and crankpin. An auxiliary piston reciprocates in the other cylinder and is driven in timed relation to the working piston by means of a cam affixed to the crankshaft and a cam follower attached to a connecting rod. Means are provided for adjusting the relative timing of the two pistons so as to vary the compression ratio of the engine. The auxiliary piston may function as a compression and ignition means by moving rapidly toward its top dead center position only when the working piston is close to its top dead center position. Other movements of the auxiliary piston provide the advantages of low pressure internal supercharging, and minimizing the retarding effect on the working piston by the compressive forces within the combustion chamber.

30 Claims, 13 Drawing Figures

FIG. 4.   TIMING OF ENGINE COMPONENTS

| | 0° 30 60 90 120 150 | 180° 210 240 270 300 330 | | 360° |
|---|---|---|---|---|
| POWER PISTON | FALLS TO BDC | | RISES TO TDC | |
| AUXILIARY PISTON | REMAINS AT TDC | FALLS TO BDC | REMAINS AT BDC | RISES TO TDC |
| EXHAUST PORTS | CLOSED | OPEN | CLOSED | |
| FRESH AIR INTAKE PORTS | CLOSED | OPEN | CLOSED | |
| AIR AND FUEL INTAKE VALVE | CLOSED | | OPEN | CLOSED |

INTERNAL COMBUSTION ENGINE

BACKGROUND OF THE INVENTION

1. Field of the Invention

This invention relates to internal combustion piston engines of general application.

2. Description of the Prior Art

In most contemporary internal combustion piston engines, the balance of performance, efficiency, flexibility and longevity is less than optimum because of inherent limitations in their design.

In spark-ignition engines, this is due in large part to a fixed, lower than optimum compression ratio which is dictated by emissions considerations and the detonation pressure of the fuel. Engine torques are lower than optimum because of compromises in piston stroke. A long stroke is desirable because it generally yields a higher torque. However, the performance of long stroke engines is inhibited by the retarding effect on the pistons during their compression strokes. Relative short stroke spark-ignition engines are prevalent because a shorter stroke minimizes the retarding effect. However, short-stroke engines usually rely on a higher speed of operation in order to compensate for the lower torque. In turn, these high speed engines have a shorter life expectancy and suffer efficiency losses due to incomplete combustion and mechanical losses because of the need for large gear trains for speed reduction.

In compression-ignition engines a long stroke is more common, but the retarding effect is also a limiting factor. Hence, the maximum compression ratio is somewhat restricted by the retarding effect and the physical constraints of engine size. In addition, contemporary compression ignition engines, such as diesels, utilize high pressure fuel injectors to inject fuel into each cylinder at a precisely timed moment. These injection systems tend to be costly because they must be designed to operate reliably under high pressure conditions. The injectors often tend to foul with minute particles in the fuel and with carbon deposits due to incomplete combustion within the cylinders. Incomplete combustion is often due to changing load conditions which an engine having a fixed compression ratio cannot adapt to.

Several prior art attempts have been made to develop internal combustion engines of the spark-ignition type having compression ratios which may be varied according to the load conditions encountered. Some of these engines employ load response mechanisms which vary the position of an auxiliary piston (disposed in the same cylinder as the working piston) to vary the combustion volume and, hence, the compression ratio. In these engines, the auxiliary piston remains stationary during engine operation except when adjustment is made to change the compression ratio. However, because of their limited movement, these auxiliary pistons fail to receive adequate lubrication. It has also been proposed to employ two opposed working pistons to vary the combustion volume between the two pistons by changing the relative timing of the pistons. In these types of engines, all of the pistons are driven by means of crankshafts and connecting rods, the relative motions of the pistons being less than ideal for the attainment of optimum engine performance and efficiency. Furthermore, these solutions have not helped to solve the aforementioned problems inherent in prior art compression-ignition engines.

SUMMARY OF THE INVENTION

It is therefore an object of the present invention to obviate the above noted shortcomings of the prior art by providing an internal combustion engine of simple construction which may burn almost any type of fuel cleanly and efficiently to yield improved performance, flexibility and longevity.

Another object of the invention is to provide such an engine which, in addition to a working piston, has an auxiliary means for compressing the fuel and air change within the combustion chamber.

Another object of the invention is to provide such an engine wherein the compression ratio may be varied widely.

Another object of the invention is to provide such an engine having a working piston with a relatively long stroke.

Another object of the invention is to provide such an engine wherein the working piston is not appreciably retarded in its compression stroke.

Another object of the invention is to provide such an engine wherein an excess of combustion air is drawn into the combustion chamber for complete combustion of the fuel.

Another object of the invention is to provide a compression ignition engine having means to retain a substantial amount of heat within the combustion chamber to foster efficient ignition and combustion of the fuel.

Another object of the invention is to provide a compression ignition engine which can run on almost any type of fuel without the need for a high pressure fuel injection system.

These and other objects of the invention are achieved by providing an internal combustion engine having an engine block with a combustion chamber adapted to receive a charge of fuel and air, a working piston in sealing engagement with the combustion chamber, compression means in communication with the combustion chamber for compressing the charge and timing means operatively interconnecting the working piston and the compression means to synchronize their operations. In a compression ignition engine according to the invention, the compression means acts to compress the charge to heat and ignite the fuel.

The compression means comprises an auxiliary piston having a top made of a material such as cast iron which will absorb intense heat without deforming and will not fail under high pressure. The auxiliary piston reciprocates in a cylinder adjacent to and interconnected with the cylinder housing the working piston. The timing means comprises a cam which is affixed to the engine crankshaft and drives a cam follower attached to the auxiliary piston connecting rod. The cam has a profile which causes the two pistons to move in timed relation such that the auxiliary piston moves rapidly upward to compress the charge only when the working piston is close to its top dead center position, and reaches the combustion point preferably after the working piston has passed its top dead center position. For compression-ignition, the substantial amount of heat retained by the cast iron top of the auxiliary piston insures efficient ignition and combustion of the fuel.

The timing means also causes the auxiliary piston to dwell at its top dead center position as the working piston is driven downwardly by the pressure of combustion. Then, as the working piston moves toward its top dead center position, the auxiliary piston drops, induces a partial vacuum within the system which draws in the fuel and an additional quantity of air, then continues to its bottom dead center position and dwells there. This motion of the auxiliary piston substantially reduces the retarding effect on the working piston and, with the intake valve open, a volume of excess air is drawn into the combustion chamber for efficient, thorough burning of the fuel. Because the intake valve opens into the working cylinder, the fuel and air will be turbulently mixed as it is drawn into the auxiliary cylinder through the relatively narrow connecting channel between the two cylinders.

A mechanism is provided for varying the compression ratio of the engine. Since the compression ratio is a function of the minimum combustion volume of the engine, and this volume is dependent on the relative positions of the two pistons, the mechanism enables the relative timing of the instant each piston reaches its top dead center position to be varied. This mechanism comprises a positioning arm for adjustably positioning the cam follower on the contoured surface of the cam.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

FIG. 4 is a table which illustrates the timing of the engine components; and

DESCRIPTION OF A PREFERRED EMBODIMENT

The description that follows relates to an in-line, air-cooled compression-ignition engine according to the invention having one working cylinder and one auxiliary cylinder. It is to be understood, however, that an engine according to the invention may be liquid-cooled, and may be constructed with any number of cylinders in any configuration, such as flat-opposed type, V-type, etc. In addition, some of the principles of the invention may be applicable to spark-ignition engines.

Figure 1:
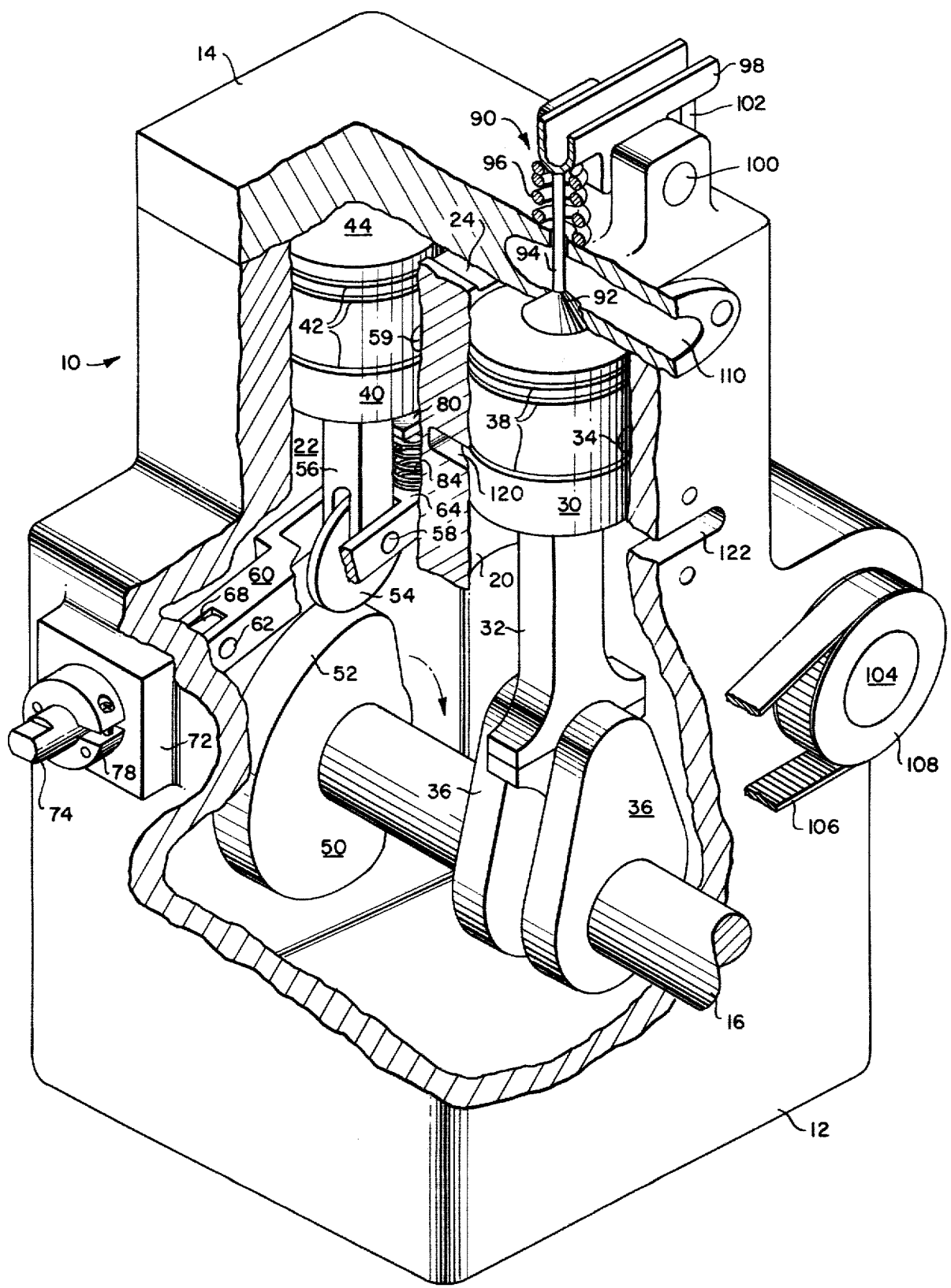
FIG. 1 is a perspective, schematic view, partially cut away, of a compression-ignition engine according to the invention.

Referring to FIG. 1, a compression ignition engine according to the invention comprises an engine block 10 having a lower crankcase 12 and a cylinder head 14. A crankshaft 16 is journalled for rotation in crankcase 12. Within the block 10 are a working cylinder 20 and an auxiliary cylinder 22 which are interconnected at their upper ends by a relatively narrow connecting channel 24.

A working piston 30 reciprocates within working cylinder 20, thereby defining a working combination chamber. This piston is connected to crankshaft 16 by means of a connecting rod 32 which is connected at its upper end to a wrist pin 34 and at its lower end to a crankpin 35 (see FIG. 3) which interconnects crank portions 36. Piston rings 38 form an effective seal between working piston 30 and working cylinder 20.

An auxiliary piston 40 reciprocates within auxiliary cylinder 22, thereby defining an auxiliary combustion chamber. Piston 40 has piston rings 42 which form an effective seal between the piston and the cylinder 22. Auxiliary piston 40 is optionally formed with a cast iron top 44 which retains a greater amount of heat than the steel conventionally used in piston manufacture and the steel of which working piston 30 is made. The importance of this construction is described below. The two pistons are illustrated as being of the same diameter, but their relative sizes (and the corresponding sizes of their cylinders) may be varied to vary engine performance as long as the engine operates according to the principles of the invention.

In order to synchronize the movement of auxiliary piston 40 with that of working piston 30, a timing mechanism is provided which comprises a cam 50 fixed to crankshaft 16. Cam 50 has a contoured surface 52 on which a cam follower roller 54 rides. Roller 54 is journalled in the bifurcated end of a connecting rod 56 by means of a pivot pin 58. The upper end of connecting rod 56 is connected to auxiliary piston 40 by means of a wrist pin 59.

Figure 2:
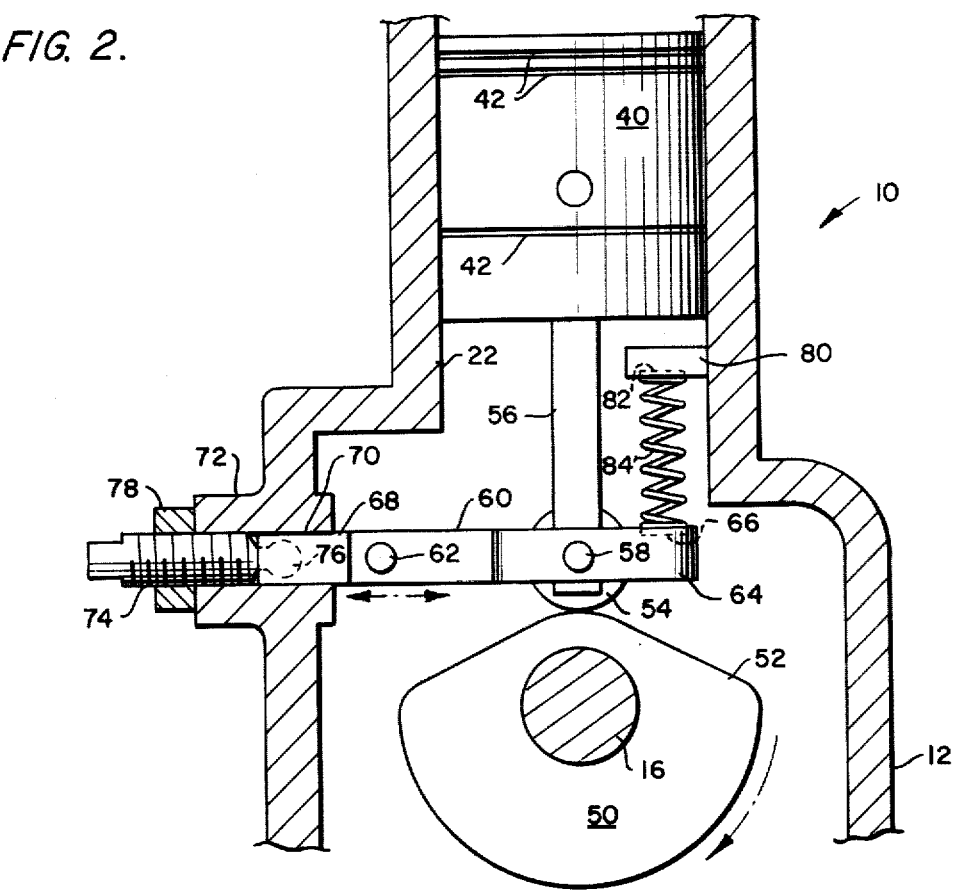
FIG. 2 is a sectional view of the same.

Referring to FIGS. 1 and 2, roller 54 is adjustably positioned on the contoured surface 52 of cam 50 by a positioning arm comprising a slotted yoke 60 which embraces connecting rod 56 and roller 54 and is pivotally attached thereto by means of pivot pin 58. Positioning arm 60 is attached at one end to an adjustable pivot 62. Adjustable pivot 62 is attached to a rod 68 which is received in a bore 70 formed in a boss 72 of engine block 10. Rod 68 is connected to a threaded stud 74 by means of a ball-and-socket joint 76. Threaded stud 74 is threadably engaged with the interior of bore 70 so that upon rotation of stud 74, pivot point 62 will move laterally with respect to crankshaft 16. A locking collar 78 is provided to maintain the set position of threaded stud 74.

In order to continuously urge roller 54 against the contoured surface 52 of cam 50, a biasing means is provided which comprises an abutment 80 formed on the engine block between the lowermost point of travel of auxiliary piston 40 and a cantilevered entension 64 of positioning arm 60. The underside of abutment 80 and the upper surface of extension 64 are each provided with a generally circular recess 82 and 66, respectively. A helical coil spring 84 is retained in compression between recesses 66 and 82 to provide the required biasing force.

Fuel and air are admitted into working cylinder 20 by means of an intake poppet valve 90 located in cylinder head 14. This valve is of conventional construction and comprises a valve body 92, a valve stem 94 and a helical valve spring 96. Intake valve 90 is actuated by means of a rocker arm 98 pivoted about rocker shaft 100 and driven by means of pushrod 102 from camshaft 104. Camshaft 104 is conventionally journalled in cylinder block 10 and is driven by means of a conventional cog belt 106 trained around cog pulley 108 and another cog pulley (not shown) attached to crankshaft 16. Any other type of driving mechanism, such as a chain and gear arrangement, may be used to drive camshaft 104. Alternatively, push rod 102 may be driven directly by a separate cam fixed to crankshaft 16. Intake valve 90 permits the entry of fuel and air from intake manifold 110. Intake manifold 110 may be connected to a carburetor or to a source of air and a low pressure fuel injection system or other fuel metering device which provides the combustion chamber with a supply of fuel and sufficient air for efficient combustion.

Figure 7:
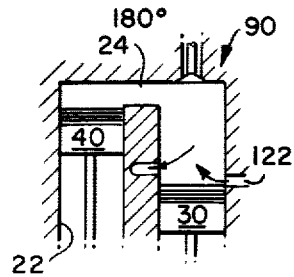
Figure 8:
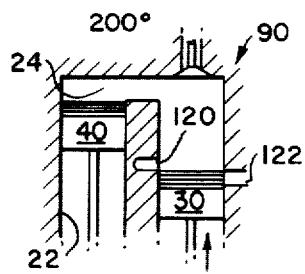
Figure 9:
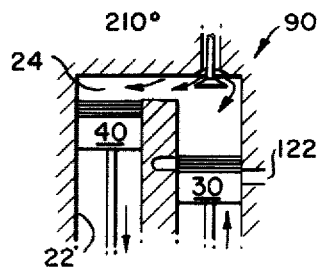
Figure 10:
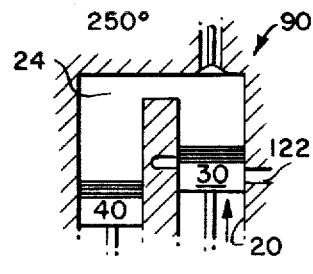
Figure 11:
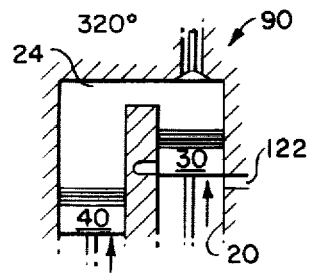
Figure 12:
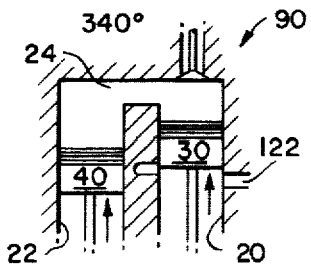
Figure 13:
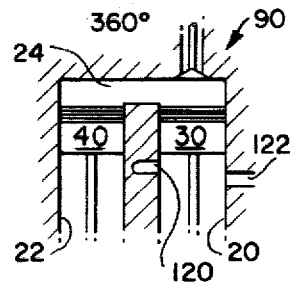

This particular compression-ignition engine operates in a two-stroke cycle. An exhaust port 120 is formed in the lower portion of working cylinder 20 at a position above the working face of the piston when at its bottom dead center position (see FIG. 7). In addition, an air inlet port 122 is formed in the lower portion of working cylinder 20 slightly lower than exhaust port 120. Air intake port 122 serves to admit a quantity of air only which functions to scavenge exhaust gases from working cylinder 20 and serve as excess air to insure complete combustion, as explained more fully below.

Figure 3:
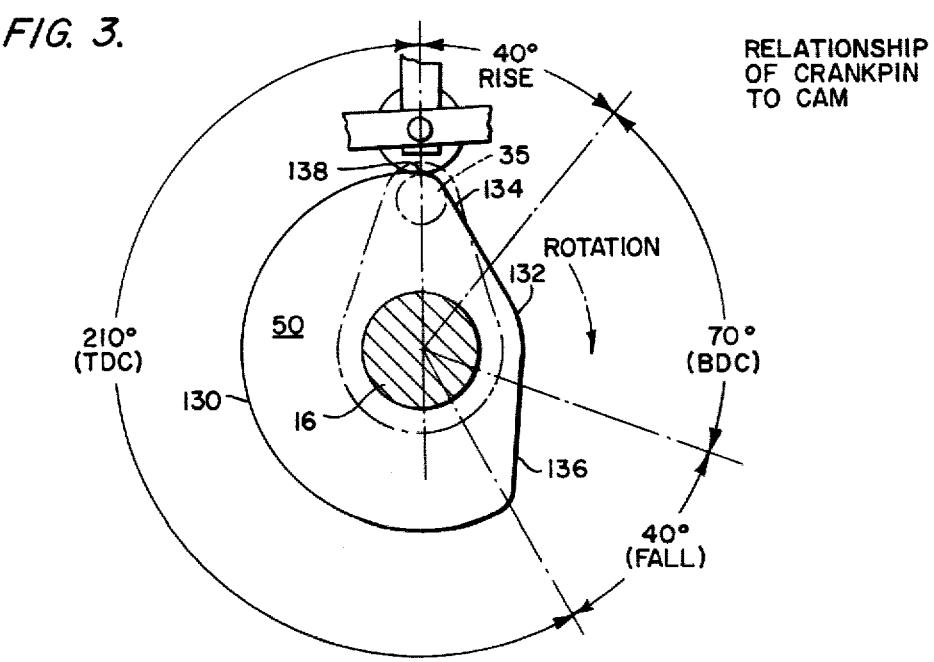
FIG. 3 is a schematic illustrating the relationship of several engine components.
Figure 5:
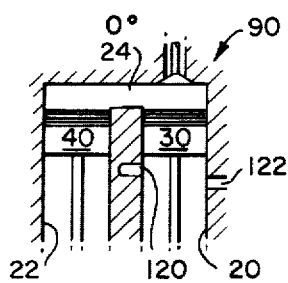
FIGS. 5 through 13 schematically illustrate various phases of engine operation and the relative positions of various engine components.
Figure 6:
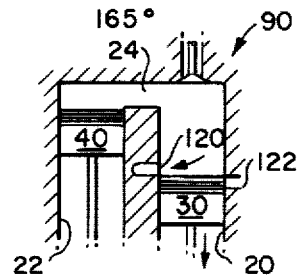

Referring to FIG. 3, cam 50 has a profile consisting of a high portion 130 of constant radius extending approximately 180° around the crankshaft. A low portion 132 of smaller constant radius is diametrically opposed to the high portion and extends approximately 100° around the crankshaft. Two transition portions 134 and 136 connect the ends of the high and low portions. With the direction of rotation of crankshaft 16 as indicated in FIG. 3, transition portion 134 is a rising transition portion in that it serves to cause auxiliary piston 40 to rise from its bottom dead center position (with roller 54 riding on lower portion 132) to its top dead center position (with roller 54 riding on high portion 130). The precise profile of cam 50 as described above has been found to yield satisfactory engine performance. However, variations in cam design may be made to vary engine performance as long as the net result is to render the engine operable according to the principles of the invention.

Cam 50 is related to crankpin 35 such that the beginning 138 of high portion 130 is at substantially the same angular position on the crankshaft as crankpin 35. With roller 54 positioned as shown in FIG. 3, this relationship results in both pistons reaching their top dead center positions at the same instant. However, this relative timing may be varied by moving pivot point 62 as aforesaid. If pivot point 62 is moved to the right, roller 54 will still be riding on transition portion 134 when crank pin 35 is in its vertical position, resulting in auxiliary piston 40 reaching its top dead center position after working piston 30 has passed its top dead center position. Conversely, if pivot point 62 is moved to the left, roller 54 will reach the beginning 138 of high portion 130 before crank pin 35 reaches its vertical position, resulting in the auxiliary piston reaching its top dead center position before the working piston does. Any range of adjustability may be provided, but an effective range will permit the auxiliary piston to reach its top dead center position from 10° (of crankshaft rotation) before the working piston reaches its top dead center position to 10° after the working piston reaches its top dead center position.

The combustion chamber is defined by the surfaces of cylinders 20 and 22, the working faces of pistons 30 and 40, the underside of cylinder head 14 and the surfaces of connecting channel 24. Of course, the volume of the combustion chamber is constantly changing with the movement of the pistons. However, the smallest attainable combustion volume, which is determinative of the compression ratio, is a function of the relative timing of the instant each piston reaches its top dead center position. For example, the smallest attainable combustion volume, and hence the greatest compression ratio, will be obtained when both pistons reach their top dead center positions simultaneously. On the other hand, if working piston 30 has passed its top dead center position when auxiliary piston 40 reaches its top dead center position, a larger minimum combustion volume will result with a corresponding lower compression ratio. Accordingly, the movement of pivot point 62 is effective to vary the compression ratio of this engine. A range of compression ratios of up to 40:1 can be achieved.

The operation of the engine will now be described in detail with reference to FIGS. 4 through 13. For simplicity, these figures illustrate the timing and relative positions of the engine components with the timing mechanisms adjusted so that both pistons reach their top dead center positions simultaneously. However, more efficient operation can be achieved by adjusting the relative timing so that the auxiliary piston reaches its top dead center position slightly after the working piston has begun its downstroke. The degree markings represent the angular position of crank pin 35, 0° indicating its vertical position or the top dead center position of working piston 30.

Beginning at 0° and combustion of the fuel, the pressure of combustion forces working piston 30 downward while auxiliary piston 40 remains at its top dead center position for a full 210° (the duration of the high portion 130 of cam 50). At approximately 150° exhaust port 120 is uncovered and products of combustion exit from the combustion chamber as working piston 30 continues to move downwardly. Approximately 15° later air intake port 122 is uncovered. Fresh air admitted through air intake port 122 scavenges much of the remaining exhaust gases from the combustion chamber. This is particularly effective if a pressurized source of air is connected to air intake port 122.

After the working piston 30 reaches its bottom dead center position (180°), and rises to the point where the exhaust port is closed, the air and fuel intake valve 90 opens and auxiliary piston 40 begins to fall rapidly through approximately 40° of crankshaft rotation. During this time, working piston 30 moves upwardly through only a small percentage of its stroke. Hence, the volume of the combustion chamber is enlarged by the movement of auxiliary piston 40, and this creates a partial vacuum which draws in fuel and air through intake valve 90. This creates a low pressure supercharging effect which draws a greater amount of air into the combustion chamber than could be drawn in by the working piston alone. Fuel and air passing from working cylinder 20 to auxiliary cylinder 22 are advantageously turbulently mixed in connecting channel 24. At approximately 250°, fuel and air intake valve 90 closes.

Auxiliary piston 40 continues to move toward and then remains at its bottom dead center position (roller 54 now riding on low portion 132 of cam 50) so that, as working piston 30 rises through a substantial portion of its stroke, only a small amont of compression work is done by working piston 30. Because of this, working piston 30 is not appreciably retarded in its upstroke by the compressive forces that would normally be present if working cylinder 30 were closed at is upper end. While the auxiliary piston is itself somewhat retarded during its upstroke, the net effect of this engine design is a reduction in the overall retarding effect.

During approximately the last 40° of crankshaft rotation, working piston 30 rises the remaining small percentage of its stroke to its top dead center position while auxiliary piston 40 moves rapidly upward toward its top dead center position to rapidly heat the charge of fuel and air within the combustion chamber and ignite the fuel. Ignition is fostered by the hotter than normal cast iron working face of auxiliary piston 40.

Because the amount of compression work done by the working piston 30 is relatively small, this engine is particularly well adapted to a long stroke design with its inherent advantages of high torque, slow speed and high efficiency. The excess air drawn into the combustion chamber by auxiliary piston 40 provides for extremely through combustion with a minimum of undesirable emissions products. An additional advantage resides in the fact that a high pressure fuel injection system with its attendant disadvantages is not required. Hence, any type of fuel, even solid powdered or pelletized fuel, may be metered into intake manifold 110 and drawn into the combustion chamber through fuel and air intake valve 90. Depending on the type of fuel used and the load conditions encountered, the timing may be adjusted to eliminate premature detonation and maximize performance. This can be accomplished by adjusting the timing so that the auxiliary piston reaches its top dead center position after the working piston has passed its top dead center position.

Although the present invention has been illustrated in terms of a preferred embodiment, it will be obvious to one of ordinary skill that numerous modifications may be made without departing from the true spirit and scope of the invention which is to be limited only by the appended claims. For example, any suitable mechanism may be provided for adjusting the relative timing of the two pistons. Prior art internal combustion engines have been designed with load condition responsive mechanisms which can automatically adjust certain elements within the engine. Hence, devices of this type could be adapted to automatically adjust the position of pivot point 62 in response to changes in load, atmospheric pressure, temperature, etc. In this regard, a load responsive device may comprise a vacuum diaphragm linked to pivot point 62 and actuated by means of engine intake manifold vacuum.

While the working cylinder and auxiliary cylinder have been disclosed as disposed adjacent to one another, it is clear that any arrangement of the cylinders may be provided as long as they can be conveniently interconnected by means of a connecting channel. For example, the two cylinders may be disposed coaxially of one another, with a narrow connecting channel formed between them and a suitable linkage interposed between cam 50 and the oppositely moving auxiliary piston. While a cast iron top for the auxiliary piston has been disclosed, other types of materials may be used as long as they retain a greater amount of heat than the steel ordinarily used in piston constructions and are otherwise suitable for internal combustion use. The principles of the invention could also be applied to internal combustion engines of the four stroke cycle type.

I claim:

1. In an internal combustion engine having intake means for admitting fuel and air into the engine and exhaust means for exhausting products of combustion therefrom:
   an engine block having a combustion chamber adapted to receive a charge of fuel and air;
   a working piston is sealing engagement with said combustion chamber for converting the energy of combustion into useful work, said working piston reciprocating between a top dead center position whereby the volume of the combustion chamber is diminished, and a bottom dead center position whereby the volume of the combustion chamber is enlarged;
   compression means in communication with said combustion chamber for compressing the charge only when said working piston is close to its top dead center position, said compression means comprising an auxiliary piston is sealing engagement with said combustion chamber, said auxiliary piston reciprocating between a top dead center position whereby the volume of said combustion chamber is diminished and a bottom dead center position whereby the volume of said combustion chamber is enlarged, the net volume of said combustion chamber depending on the relative positions of said pistons;
   timing means operatively interconnecting said working piston and said compression means to synchronize their operations, said timing means comprising a rotatably driven cam having a contoured cam surface, a cam follower comprising a roller urged against said cam surface, and a connecting rod connecting said auxiliary piston and said cam follower, said connecting rod having a bifurcated lower end and said roller being journalled therein; and
   positioning means for adjustably positioning said cam follower with respect to said cam surface, whereby the relative timing of the instant each piston reaches its top dead center position may be changed to vary the compression ratio of the engine, said positioning means comprising a positioning arm connected between said cam follower and an adjustable pivot, said positioning arm comprising a slotted yoke embracing said roller and said bifurcated end of said connecting rod and joined thereto by means of a pivot pin.

2. In an internal combustion engine:
   an engine block;
   a working cylinder formed in said engine block adapted to receive a charge of fuel and air;
   an auxiliary cylinder formed in said engine block next to said working cylinder;
   a cylinder head connected to said block for closing the tops of said cylinders;
   a working piston reciprocating in said working cylinder;
   an auxiliary piston reciprocating in said auxiliary cylinder;
   a crankshaft journalled for rotation in said engine block below said cylinders;
   a crank pin carried by said crankshaft below said working cylinder;
   a working connecting rod connected between said working piston and said crank pin, said working connecting rod limiting the movement of said working piston between a top dead center position and a bottom dead center position;
   a cam fixed to said crankshaft below said auxiliary cylinder and rotatable therewith, said cam having a contoured cam surface;
   a cam follower urged against said cam surface;
   an auxiliary connecting rod connecting said auxiliary piston and said cam follower, said auxiliary connecting rod limiting the movement of said auxiliary piston between a top dead center position and a bottom dead center position;

a connecting port interconnecting said cylinders adjacent their upper ends;

intake means operatively connected to said working piston to open and close in timed relation to the movement of said working piston and admit fuel and air into said cylinders when open, said intake means comprising an air intake port formed in a lower portion of the wall of said working cylinder and closable by said working piston, and a fuel and air intake valve carried by said cylinder head; and exhaust means operatively connected to said working piston to open and close in timed relation to the movement of said working piston and exhaust products of combustion from said cylinders when open.

3. In an internal combustion engine:

an engine block;

a working cylinder formed in said engine block adapted to receive a charge of fuel and air;

an auxiliary cylinder formed in said engine block next to said working cylinder;

a cylinder head connected to said block for closing the tops of said cylinders;

a working piston reciprocating in said working cylinder;

an auxiliary piston reciprocating in said auxiliary cylinder;

a crankshaft journalled for rotation in said engine block below said cylinders;

a crank pin carried by said crankshaft below said working cylinder;

a working connecting rod connected between said working piston and said crank pin, said working connecting rod limiting the movement of said working piston between a top dead center position and a bottom dead center position;

a cam fixed to said crankshaft below said auxiliary cylinder and rotatable therewith, said cam having a contoured cam surface;

a cam follower urged against said cam surface, said cam follower comprising a roller pivotally connected to said auxiliary connecting rod;

an auxiliary connecting rod connecting said auxiliary piston and said cam follower, said auxiliary connecting rod limiting the movement of said auxiliary piston between a top dead center position and a bottom dead center position;

a connecting port interconnecting said cylinders adjacent their upper ends;

intake means operatively connected to said working piston to open and close in timed relation to the movement of said working piston and admit fuel and air into said cylinders when open; and exhaust means operatively connected to said working piston to open and close in timed relation to the movement of said working piston and exhaust products of combustion from said cylinders when open.

4. In an internal combustion engine:

an engine block;

a working cylinder formed in said engine block adapted to receive a charge of fuel and air;

an auxiliary cylinder formed in said engine block next to said working cylinder;

a cylinder head connected to said block for closing the tops of said cylinders;

a working piston reciprocating in said working cylinder;

an auxiliary piston reciprocating in said auxiliary cylinder;

a crankshaft journalled for rotation in said engine block below said cylinders;

a crank pin carried by said crankshaft below said working cylinder;

a working connecting rod connected between said working piston and said crank pin, said working connecting rod limiting the movement of said working piston between a top dead center position and a bottom dead center position;

a cam fixed to said crakshaft below said auxiliary cylinder and rotatable therewith, said cam having a contoured cam surface;

a cam follower comprising a roller urged against said cam surface;

an auxiliary connecting rod connecting said auxiliary piston and said cam follower, said auxiliary connecting rod limiting the movement of said auxiliary piston between a top dead center position and a bottom dead center position;

a connecting port interconnecting said cylinders adjacent their upper ends;

intake means operatively connected to said working piston to open and close in timed relation to the movement of said working piston and admit fuel and air into said cylinders when open;

exhaust means operatively connected to said working piston to open and close in timed relation to the movement of said working piston and exhaust products of combustion from said cylinders when open; and positioning means operatively connected to said cam follower for adjustably positioning said cam follower with respect to said cam surface, said positioning means comprising a positioning arm connected between said cam follower and an adjustable pivot, said cam follower roller being journalled for rotation in both said auxiliary connecting rod and said positioning arm.

5. In an internal combustion engine:

an engine block;

a working cylinder formed in said engine block adapted to receive a charge of fuel and air;

an auxiliary cylinder formed in said engine block next to said working cylinder;

a cylinder head connected to said block for closing the tops of said cylinders;

a working piston reciprocating in said working cylinder;

an auxiliary piston reciprocating in said auxiliary cylinder;

a crankshaft journalled for unidirectional rotation in said engine block below said cylinders;

a crank pin carried by said crankshaft below said working cylinder;

a working connecting rod connected between said working piston and said crank pin, said working connecting rod limiting the movement of said working piston between a top dead center position and a bottom dead center position;

a cam fixed to said crankshaft below said auxiliary cylinder and rotatable therewith, said cam having a contoured cam surface with a profile comprising a high portion of constant radius extending approximately 180° around said crankshaft, a low portion of smaller constant radius diametrically opposed to said high portion and extending approximately 100° around said crankshaft, and two transition portions connecting the ends of said high and low portions and each extending approximately 40° around said crankshaft;

a cam follower urged against said cam surface;

an auxiliary connecting rod connecting said auxiliary piston and said cam follower, said auxiliary connecting rod limiting the movement of said auxiliary piston between a top dead center position and a bottom dead center position;

a connecting port interconnecting said cylinders adjacent their upper ends;

intake means operatively connected to said working piston to open and close in timed relation to the movement of said working piston and admit fuel and air into said cylinders when open; and exhaust means operatively connected to said working piston to open and close in timed relation to the movement of said working piston and exhaust products of combustion from said cylinders when open, one of the transition portions of said cam profile being a rising transition portion which drives said cam follower upward from said low portion to the beginning of said high portion, said cam being angularly related to said crank pin such that the beginning of said high portion is at substantially the same angular position on said crankshaft as said crank pin, whereby:

said auxiliary piston drops to its bottom dead center position and dwells there while said working piston rises toward its top dead center position over a substantial portion of its stroke so that said working piston is not appreciably retarded in its stroke by the compressive forces within said cylinders;

said auxiliary piston rises rapidly toward its top dead center position to compress the charge only when said working piston is close to its top dead center position; and said auxiliary piston dwells at its top dead center position while said working piston is forced down toward its bottom dead center position by the pressure of combustion.

6. In an internal combustion engine:

a working cylinder defining a working combustion chamber adapted to receive a charge of fuel and air;

an auxiliary cylinder defining an auxiliary combustion chamber;

a working piston in sealing engagement with said working cylinder for converting the energy of combustion into useful work, said working piston reciprocable in said working cylinder between a top dead center position whereby the volume of the working combustion chamber is diminished and a bottom dead center position whereby the volume of the working combustion chamber is enlarged;

an auxiliary piston in sealing engagement with said auxiliary cylinder and reciprocable therein between a top dead center position whereby the volume of the auxiliary combustion chamber is diminished and a bottom dead center position whereby the volume of the auxiliary combustion chamber is enlarged;

a connecting channel interconnecting said working and auxiliary cylinders above the top dead center positions of said working and auxiliary pistons so that said working and auxiliary combustion chambers are in communication, said connecting channel having a cross-section which is substantially smaller than the cross-sections of said working and auxiliary cylinders;

intake means operatively connected to said working piston to admit fuel and air into said working cylinder in timed relation to the movement of said working piston, said intake means including an intake port opening into said working cylinder;

exhaust means operatively connected to said working piston to cause products of combustion to be exhausted from said working cylinder in timed relation to the movement of said working piston; and timing means operatively interconnecting said working and auxiliary pistons to synchronize their movements such that said auxiliary piston moves rapidly downward to its bottom dead center position while said working piston is substantially at its bottom dead center position and said intake means is open, whereby fuel and air are drawn into the working cylinder, through said connecting channel and into said auxiliary cylinder and thereby turbulently mixed by the downward movement of said auxiliary piston.

7. In a two-stroke cycle internal combustion engine:

a working cylinder defining a working combustion chamber adapted to receive a charge of fuel and air;

an auxiliary cylinder defining an auxiliary combustion chamber;

a working piston in sealing engagement with said working cylinder for converting the energy of combustion into useful work, said working piston reciprocable in said working cylinder between a top dead center position whereby the volume of the working combustion chamber is diminished and a bottom dead center position whereby the volume of the working combustion chamber is enlarged;

an auxiliary piston in sealing engagement with said auxiliary cylinder and reciprocable therein between a top dead center position whereby the volume of the auxiliary combustion chamber is diminished and a bottom dead center position whereby the volume of the auxiliary combustion chamber is enlarged;

a connecting channel interconnecting said working and auxiliary cylinders above the top dead center positions of said working and auxiliary pistons so that said working and auxiliary combustion chambers are in communication;

intake means operatively connected to said working piston to admit fuel and air into said working cylinder whenever said working piston is near and at its bottom dead center position;

exhaust means operatively connected to said working piston to cause products of combustion to be exhausted from said working cylinder whenever said working piston is near and at its bottom dead center position; and timing means operatively interconnecting said working and auxiliary pistons to synchronize their movements such that:

said auxiliary piston moves rapidly downward to its bottom dead center position whenever said working piston is substantially at its bottom dead center position to thereby draw air and fuel into said working and auxiliary cylinders; and said auxiliary piston moves rapidly upward toward its top dead center position whenever said working piston is close to its top dead center position to thereby compress the charge of air and fuel in said working and auxiliary cylinders.

8. In a two-stroke cycle internal combustion engine:
an engine block;
a working cylinder formed in said engine block adapted to receive a charge of fuel and air;
an auxiliary cylinder formed in said engine block next to said working cylinder;
a cylinder head connected to said block for closing the tops of said cylinders;
a working piston reciprocating in said working cylinder;
an auxiliary piston reciprocating in said auxiliary cylinder;
a crankshaft journalled for rotation in said engine block below said cylinders;
a crank pin carried by said crankshaft below said working cylinder;
a working connecting rod connected between said working piston and said crank pin, said working connecting rod limiting the movement of said working piston between a top dead center position and a bottom dead center position;
a cam fixed to said crankshaft below said auxiliary cylinder and rotatable therewith, said cam having a contoured cam surface;
a cam follower urged against said cam surface;
an auxiliary connecting rod connecting said auxiliary piston and said cam follower, said auxiliary connecting rod limiting the movement of said auxiliary piston between a top dead center position and a bottom dead center position;
a connecting port interconnecting said cylinders adjacent their upper ends;
intake means operatively connected to said working piston to open and close in timed relation to the movement of said working piston and admit fuel and air into said cylinders when open; and
exhaust means operatively connected to said working piston to open and close in timed relation to the movement of said working piston and exhaust products of combustion from said cylinders when open,
said cam surface being contoured to cause said auxiliary piston to move rapidly downward to its bottom dead center position whenever said working piston is substantially at its bottom dead center position to thereby draw air and fuel into said working and auxiliary cylinders, and to cause said auxiliary piston to move rapidly upward toward its top dead center position whenever said working piston is close to its top dead center position to thereby compress the charge of air and fuel in said working and auxiliary cylinders.

9. An engine according to claim 7 further comprising a crankshaft journalled for rotation below said working cylinder, a crank pin carried by said crankshaft below said working cylinder, and a working connecting rod interconnecting said working piston and said crank pin, and wherein said timing means comprises a cam rotatably driven by said crankshaft at the same angular speed as said crankshaft, said cam having a contoured cam surface, a cam follower in engagement with said cam surface, and an auxiliary connecting rod interconnecting said auxiliary piston and said cam follower.

10. An engine according to claim 9 wherein said auxiliary cylinder is adjacent said working cylinder, and said cam is connected to and rotatable with said crankshaft beneath said auxiliary cylinder.

11. An engine according to claim 7 wherein said timing means causes:
said auxiliary piston to move to its bottom dead center position and dwell there while said working piston moves toward its top dead center position over a substantial portion of its stroke so that said working piston is not appreciably retarded in its stroke by the compressive forces within said combustion chamber; and
said auxiliary piston to dwell at its top dead center position while said working piston is forced toward its bottom dead center position by the pressure of combustion.

12. An engine according to claim 7 wherein each of said pistons has a working face exposed to the interior of said combustion chamber, the working face of said auxiliary piston being formed of a material which a greater amount of heat than the material of which the working face of said working piston is formed.

13. An engine according to claim 12 wherein the working face of said auxiliary piston is formed of cast iron.

14. An engine according to claim 7 or 11 wherein said timing means is adjustable to vary the relative timing of the instant when each piston reaches its top dead center position, whereby the compression ratio of the engine may be varied.

15. An engine according to claim 14 wherein said timing means is adjustable to vary the compression ratio up to 40:1.

16. An engine according to claim 9 further comprising positioning means for adjustably positioning said cam follower with respect to said cam surface, whereby the relative timing of the instant each piston reaches its top dead center position may be changed to vary the compression ratio of the engine.

17. An engine according to claim 16 wherein said positioning means comprises a positioning arm connected between said cam follower and an adjustable pivot.

18. An engine according to claim 17 wherein said cam follower comprises a roller journalled for rotation in both said connecting rod and said positioning arm.

19. An engine according to claim 17 wherein said adjustable pivot comprises a longitudinally adjustable threaded rod having a free end pivotally connected to said positioning arm.

20. An engine according to claim 18 further comprising biasing means for resiliently urging said roller into contact with said cam surface.

21. An engine according to claim 20 wherein said biasing means comprises:
a fixed abutment between said auxiliary piston and said positioning arm;
a recess formed in each of the facing surfaces of said positioning arm and said abutment; and
a spring retained in compression between said recesses.

22. An engine according to claim 8 wherein said intake means comprises an air intake port formed in a lower portion of the wall of said working cylinder and closable by said working piston.

23. An engine according to claim 2 wherein said exhaust means comprises an exhaust port formed in a lower portion of the wall of said working cylinder higher than said air intake port and closable by said working piston.

24. An engine according to claim 8 further comprising positioning means operatively connected to said cam follower for adjustably positioning said cam follower with respect to said cam surface.

25. An engine according to claim 24 wherein said positioning means comprises a positioning arm connected between said cam follower and an adjustable pivot.

26. An engine according to claim 25 wherein said adjustable pivot comprises a threaded rod threadably received in said engine block and having a free end pivotally connected to said positoning arm.

27. An engine according to claim 4 wherein the lower end of said auxiliary connecting rod is bifurcated to receive said roller, said positioning arm comprising a slotted yoke embracing said roller and said bifurcated end and joined thereto by means of a pivot pin.

28. An engine according to claim 4 further comprising biasing means for resiliently urging said roller into contact with said cam surface.

29. An engine according to claim 28 wherein said biasing means comprises:
- a projecting abutment carried by said engine block between said auxiliary piston and said positioning arm;
- a recess formed in each of the facing surfaces of said positioning arm and said abutment; and
- a spring retained in compression between said recesses.

30. An engine according to claim 8 wherein said cam surface has a profile comprising:
- a high portion of constant radius extending approximately 180° around said crankshaft;
- a low portion of smaller constant radius diametrically opposed to said high portion and extending approximately 100° around said crankshaft; and
- two transition portions connecting the ends of said high and low portions and each extending approximately 40° around said crankshaft.

* * * * *